United States Patent
Kawamoto et al.

(10) Patent No.: US 11,806,806 B2
(45) Date of Patent: *Nov. 7, 2023

(54) JOINT STRUCTURE

(71) Applicant: Panasonic Intellectual Property Management Co., Ltd., Osaka (JP)

(72) Inventors: Atsuhiro Kawamoto, Hyogo (JP); Junji Fujiwara, Osaka (JP); Shigeki Yonemori, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1449 days.

This patent is subject to a terminal disclaimer.

(21) Appl. No.: 16/086,996

(22) PCT Filed: Mar. 28, 2017

(86) PCT No.: PCT/JP2017/012590
§ 371 (c)(1),
(2) Date: Sep. 20, 2018

(87) PCT Pub. No.: WO2017/170518
PCT Pub. Date: Oct. 5, 2017

(65) Prior Publication Data
US 2019/0047087 A1 Feb. 14, 2019

(30) Foreign Application Priority Data
Mar. 30, 2016 (JP) .................................. 2016-067196

(51) Int. Cl.
*B32B 3/26* (2006.01)
*B32B 15/01* (2006.01)
(Continued)

(52) U.S. Cl.
CPC ............ *B23K 26/21* (2015.10); *B23K 26/323* (2015.10); *B23K 26/324* (2013.01); *B29C 65/16* (2013.01);
(Continued)

(58) Field of Classification Search
None
See application file for complete search history.

(56) References Cited

U.S. PATENT DOCUMENTS

2009/0278371 A1* 11/2009 Fuchs .................. B29C 65/562
156/60
2009/0294410 A1* 12/2009 Iwase ..................... B21J 15/025
219/91.23
(Continued)

FOREIGN PATENT DOCUMENTS

EP      2 698 224       2/2014
JP      53-137370       11/1978
(Continued)

OTHER PUBLICATIONS

Indian Examination Report dated Oct. 26, 2020 in corresponding Indian Patent Application No. 201847035069, with English Translation.
(Continued)

*Primary Examiner* — Xiaobei Wang
(74) *Attorney, Agent, or Firm* — Wenderoth, Lind & Ponack, L.L.P.

(57) ABSTRACT

A joint structure includes a first material (1), a second material (2) weldable to the first material, and a third material (3) at least a portion of which being sandwiched between the first material and the second material, having a through opening portion at the sandwiched portion, and including a material that is difficult to be welded to both the first material and the second material, the first material and
(Continued)

the second material welded the via through opening portion. At least one of the first material and the second material is provided with a protrusion (14) inserted in the through opening portion. A first gap (4) is provided between an inner peripheral surface of the through opening portion and the protrusion. A second gap (5) is provided between the first material and the second material, the second gap having a size depending on a plate thickness of the first material in a region corresponding to the protrusion. Under a condition in which the second gap has a size of greater than or equal to 0.1 mm but less than or equal to 40% of the plate thickness of the first material in the region, the first material and the second material are welded by emitting a laser beam from a side on which the first material is disposed.

3 Claims, 6 Drawing Sheets

(51) Int. Cl.
| | | |
|---|---|---|
| *B32B 15/08* | (2006.01) | |
| *B23K 103/04* | (2006.01) | |
| *B23K 101/00* | (2006.01) | |
| *B23K 26/21* | (2014.01) | |
| *B29C 65/16* | (2006.01) | |
| *B23K 26/324* | (2014.01) | |
| *B23K 26/323* | (2014.01) | |

(52) U.S. Cl.
CPC .............. *B32B 3/266* (2013.01); *B32B 15/01* (2013.01); *B32B 15/08* (2013.01); *B23K 2101/006* (2018.08); *B23K 2103/04* (2018.08); *B32B 2250/40* (2013.01)

(56) References Cited

U.S. PATENT DOCUMENTS

| | | |
|---|---|---|
| 2014/0294489 A1 | 10/2014 | Sakai |
| 2016/0123362 A1 | 5/2016 | Iwase |
| 2017/0232548 A1* | 8/2017 | Carlson ................. B23K 11/115 |
| | | 219/91.2 |
| 2018/0050496 A1* | 2/2018 | Racineux ............ B29C 66/1122 |

FOREIGN PATENT DOCUMENTS

| | | |
|---|---|---|
| JP | 2003-290955 | 10/2003 |
| JP | 2008-006465 | 1/2008 |
| JP | 2008-030113 | 2/2008 |
| JP | 2014-188548 | 10/2014 |
| JP | 2014-226698 | 12/2014 |
| JP | 2015-042417 | 3/2015 |

OTHER PUBLICATIONS

Communication pursuant to Article 94(3) EPC dated Aug. 19, 2021 in corresponding European Patent Application No. 17775055.1.
TWI: "A Novel Method for Joining Dissimilar Material", Oct. 2007, pp. 1-4, XP055573876, Retrieved from the Internet: URL:https://www.twi-global.com/media-and-events/connect/2007/september-october-2007/a-novel-method-for-joining-dissimilarmaterials [retrieved on Mar. 25, 2019].
International Search Report of PCT application No. PCT/JP2017/012590 dated Jun. 20, 2017.
Extended European Search Report dated Apr. 9, 2019 in corresponding European Patent Application No. 17775055.1.

\* cited by examiner

JOINT STRUCTURE

TECHNICAL FIELD

The present disclosure relates to joint structures.

BACKGROUND ART

Globalization in recent years has led to an increase in the production volume of transport equipment, such as automobiles. This has resulted in a need to reduce the total cost per each one of the products such as automobiles, particularly by reducing the production time to improve productivity.

Moreover, to prevent global warming, $CO_2$ emission control is strongly required at global level, and in order to meet the requirements, transport equipment industry, such as automotive industry, has accelerated their efforts to improve fuel economy. A specific attempt to improve fuel economy includes vehicle weight reduction, and various researches are underway to increase the proportion of lighter weight materials.

With such researches being underway, spot welding is commonplace as a method of welding used in producing transport equipment such as automobiles. In spot welding, which is resistance welding, weld materials need to be pressed with upper and lower electrodes, which are spot welding guns for performing spot welding, to eliminate the gap between the weld materials, and electric current is passed between the upper and lower electrodes to effect welding. This means that spot welding is not suitable for one-side welding. In addition, in order to compress the weld materials, the upper and lower guns equipped with spot welding electrodes require clearance spaces above and below the weld material such that the guns can be fitted therein. Therefore, there is a constraint on the shape of the product. Moreover, the spot welding gun itself is heavy in weight and slow in moving speed. Even when the spot welding gun reaches a welding position, it requires some time to compress the weld material. Moreover, even after welding, it is necessary to take some time to cool the weld material. That is, spot welding requires a large amount of time in addition to the time it requires for the welding operation.

Meanwhile, to reduce the weight of materials used for automobiles, research and development are ongoing to replace some of the parts made of steel with ones made of light metal materials, such as aluminum.

Generally, it is extremely difficult to join steel with aluminum, which is a dissimilar material from steel. For this reason, spot welding with the use of rivets and joining with the use of adhesive agents, for example, are conventionally employed for joining dissimilar materials. For example, Patent Literature 1 discloses a rivet shape, swaging, and a spot welding method that absorb the plastic flow of a dissimilar material resulting from the welding heat in compressing and spot welding of the dissimilar material sandwiched by a rivet and a joining material made of a similar type of material to the rivet material. With this method, it is possible to provide space for allowing a portion of the dissimilar material to deform and move during swaging and spot welding in the rivet, and to prevent depression or the like of the dissimilar material, which may occur due to misalignment of the electrodes during spot welding. As a result, it becomes possible to inhibit the fastening force from deteriorating.

CITATION LIST

Patent Literature

PTL 1: Japanese Patent Unexamined Publication No. 2015-42417

SUMMARY

A conventional dissimilar material joining member will be described with reference to FIG. 6. As illustrated in FIG. 6, dissimilar material joining body 100 includes rivet 51, first to-be-joined material 200, and second to-be-joined material 300. Here, rivet 51 and second to-be-joined material 300 are made of the same type of material. First to-be-joined material 200 is a dissimilar material, which is made of a different material from rivet 51 and first to-be-joined material 200. Rivet 51 includes shaft 52 and head 53. Head 53 further includes R (radius) shaped chamfer 30, annular groove 31, and flat portion 32. With chamfer 30, annular groove 31, and flat portion 32, it is possible to provide space for allowing a portion of first to-be-joined material 200 to deform and move during swaging and spot welding, and to prevent depression or the like of first to-be-joined material 200, which may occur due to misalignment of electrode 400 (misalignment between axis Z1 of electrode 400 and axis Z2 of rivet 51) during spot welding. As a result, it becomes possible to inhibit the fastening force from deteriorating. In this case, however, because the shape of rivet 51 is complicated, precision machining or the like is necessary, which increases the manufacturing cost. In addition, rivet 51 and second to-be-joined material 300 are joined by spot welding, which means that it requires time for compressing, electric current application, cooling, transferring, etc., resulting in a longer work time. Moreover, it is necessary to clamp rivet 51 and second to-be-joined material 300 from both sides, which restricts flexibility of design. Furthermore, if rivets are arranged with excessively small gaps therebetween, electric current for spot welding may branch into adjacent rivets, resulting in insufficient formation of nugget, which is a weld-solidified portion that forms at a weld portion X during spot welding. For this reason, it is necessary to provide a joining pitch that is greater than or equal to the minimum gap pitch at which desired nugget formation is possible without causing electric current branching. Consequently, it is impossible to increase joining rigidity at necessary locations.

The present disclosure provides a simple joint structure for laser welding that makes it possible to achieve dissimilar material joining and improves productivity.

In order to solve the foregoing problems, a joint structure according to an aspect of the present disclosure includes a first material, a second material including a similar metal material and weldable to the first material, and a third material, at least a portion of which being sandwiched between the first material and the second material, having a through opening portion at the sandwiched portion, and including a material that is difficult to be welded to both the first material and the second material, the first material and the second material welded via the through opening portion. At least one of the first material and the second material is provided with a protrusion inserted in a through opening portion. In addition, a first gap is provided between the protrusion and an inner peripheral surface of the through opening portion. In addition, a second gap is provided between the first material and the second material, the second gap having a size depending on a plate thickness of the first material in a region depending on the protrusion along a plate thickness direction. The joint structure is obtained by welding the first material and the second material to each other by emitting a laser beam from a side on which the first material is disposed, under a condition in which the size of the second gap is greater than or equal to 0.1 mm and less than or equal to 40% of the plate thickness of the first material in the region.

In the joint structure according to another aspect of the present disclosure, the inner peripheral surface is indirectly heated and fused by welding heat input to the protrusion by the laser beam and intimately fixed to an outer peripheral side of the protrusion.

In the joint structure according to yet another aspect of the present disclosure, when viewed from a direction in which the laser beam is emitted, an incident region of the protrusion on which the laser beam is incident is smaller than a region of the protrusion in which an outer edge of the protrusion is provided.

The joint structure according to still another aspect of the present disclosure further includes a spacer disposed between the first material and the second material in the through opening portion, the spacer including a material weldable to both the first material and the second material. The spacer has a thickness less than the plate thickness of the first material in the region and depending on the size of the second gap.

Advantageous Effects of Invention

A joint structure for laser welding according to the present disclosure makes it possible to achieve highly reliable dissimilar material joining, also significantly reduce production takt time, and moreover increase rigidity at necessary locations to enhance flexibility of design.

DESCRIPTION OF EMBODIMENTS

First Exemplary Embodiment

Figure 1A:
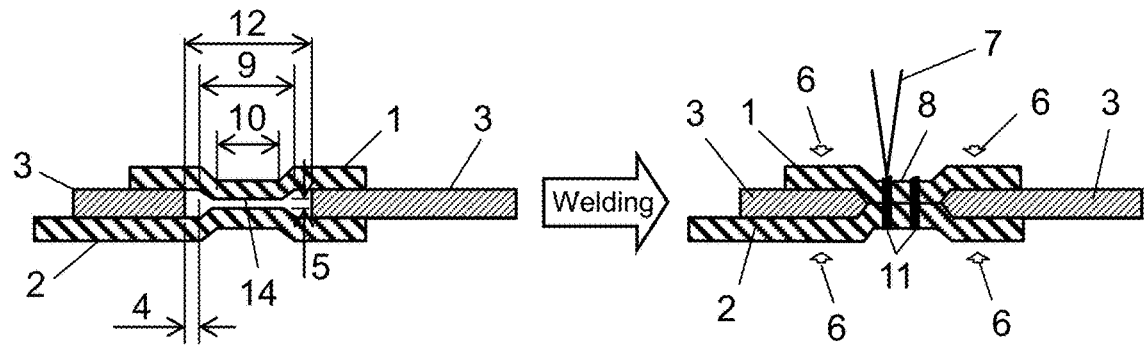
FIG. 1A is a cross-sectional view for illustrating a joint structure before and after welding according to a first exemplary embodiment of the present disclosure.
Figure 2A:
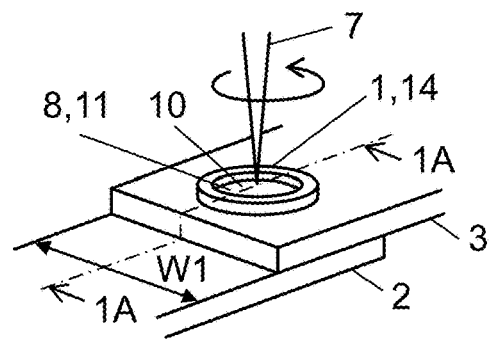
FIG. 2A is a perspective view for illustrating a state of joining in laser welding according to the first exemplary embodiment of the present disclosure.

First, a first exemplary embodiment will be described with reference to FIGS. 1A and 2A. FIG. 1A is a cross-sectional view for illustrating a joint structure before and after welding according to the first exemplary embodiment of the present disclosure. FIG. 2A is a perspective view for illustrating a joining state in laser welding according to the first exemplary embodiment of the present disclosure. FIG. 1A shows a joint structure of first material 1, second material 2, and third material 3. FIG. 1A is also a cross-sectional view taken along line 1A-1A in FIG. 2A, which illustrates a joint structure in which first material 1 as an upper plate is in a circular shape.

Herein, first material 1 and second material 2 are metal materials that are of the same type and weldable to each other. Third material 3 is a dissimilar material from first material 1 and second material 2, which is a material that is difficult to be welded to each of first material 1 and second material 2. As illustrated in FIG. 1A, in joining, third material 3, which is a dissimilar material, is disposed so as to be interposed between first material 1 and second material 2, which are similar metal materials. Herein, in third material 3, through hole 12 is pre-formed as a through opening portion. Each of first material 1 and second material 2 has protrusion 14. Protrusions 14 are inserted in through hole 12 so as to face each other. Because each of protrusions 14 of first material 1 and second material 2 is inserted into through hole 12 of third material 3, through hole 12 has the effect of preventing relative misalignment of first material 1 and second material 2 with through hole 12. In addition, protrusion 14 has the advantage of enabling the user to visually verify indication of the laser application position and appropriateness of the bead formation position.

It should be noted that although the through opening portion is formed of through hole 12 in the present disclosure, it is also possible that the through opening portion may be a through groove.

Similar metal materials refer to metals that are weldable to each other and are meant to include not only metal materials made of the same material but also metal materials that show good weldability, such as a ferrous metal material to a ferrous metal material, and a nonferrous metal material to a nonferrous metal material. In other words, similar metal materials refer to similar types of materials that are compatible with each other in welding. Specifically, examples of combinations of first material 1 and second material 2 in welding include the following. Examples of possible combinations of ferrous metal materials include mild steel to mild steel, mild steel to stainless steel, stainless steel to stainless steel, mild steel to high tensile steel, high tensile steel to stainless steel, and high tensile steel to high tensile steel. Examples of possible combinations of nonferrous metal materials include aluminum to aluminum, aluminum to aluminum alloy, and aluminum alloy to aluminum alloy.

Third material 3 as a dissimilar material is a different material from those of first material 1 and second material 2, which are similar metal materials, and made of a material that is difficult to be welded to both first material 1 and second material 2. For example, when first material 1 and second material 2 as similar metal materials are made of ferrous metal materials, third material 3 as a dissimilar material may be made of a nonferrous metal material, such as a copper material or an aluminum material. In addition, resin materials, such as carbon fiber reinforced plastics (CFRP) and polyethylene terephthalate (PET), are also possible examples of dissimilar materials from metal materials.

Protrusions 14 of first material 1 and second material 2 have substantially the same shape in the present exemplary embodiment. Here, as illustrated in FIG. 1A, the gap along the direction orthogonal to a plate thickness direction that exists between the edge (inner peripheral surface) of through hole 12 of third material 3 and protrusion outer edge 9 of each of protrusions 14 of first material 1 and second material 2, which are disposed so as to face each other, is defined as first gap 4. Also, under a condition in which protrusion 14 of first material 1 and protrusion 14 of second material 2 are inserted into through hole 12 of third material 3, the gap between protrusions 14 along the plate thickness direction is defined as second gap 5. In addition, the region defined by the inner edge of protrusion 14 is defined as protrusion inner edge 10. As illustrated in FIGS. 1A and 2A, in the present exemplary embodiment, welding is carried out using laser 7 as a laser beam. Welding is carried out, as illustrated in FIG. 2A, by emitting laser 7 from above first material 1 in the plate thickness direction toward a region defined by protrusion inner edge 10 corresponding to protrusion 14, which is a region to which laser 7 can be emitted (joinable region), in a circular shape. As a result, weld bead 11, which is a portion of weld portion 8, is formed within protrusion inner edge 10, as illustrated in FIG. 1A. Weld portion 8 is a portion in which first material 1 and second material 2 are welded together. Weld portion 8 includes weld bead 11 as welded metal formed by solidification of the fused metal that was fused during welding, and a heat-affected zone that is affected by the heat of welding. Weld bead 11 is formed.

As described above, in the present exemplary embodiment, laser 7 is emitted from the side on which first material 1 is disposed to a region defined by protrusion inner edge 10 depending on protrusion 14. It may be said that second gap 5 is the gap that is provided along the plate thickness direction between first material 1 and second material 2 within the region corresponding to protrusion 14. In other words, second gap 5 is the gap at which first material 1 and second material 2 are spaced apart along the plate thickness direction in through hole 12.

Next, a joining condition during and after welding will be described with reference to FIG. 1A. When laser 7 is emitted in a circular shape within protrusion inner edge 10 of first material 1 to perform welding, weld bead 11, which is a part of weld portion 8, is formed. At this time, weld portion 8 of first material 1, which is the metal that is fused during welding, undergoes solidification shrinkage, causing second gap 5 therebetween to contract.

Thus, in the region corresponding to protrusion 14 to which laser 7 is emitted, laser 7 is emitted in a plate thickness direction under a condition in which second gap 5 exists before welding. Consequently, first material 1 and second material 2, which are similar metal materials, are fuse-bonded and undergo solidification shrinkage, and third material 3, which is a dissimilar material sandwiched therebetween, is compressive-secured.

Specifically, the size of second gap 5 is set to be in the range of from 4% to 38%, inclusive, of the plate thickness of first material 1, which is on the side to which laser 7 is emitted. In this case, the solidification shrinkage of weld portion 8 causes compressive force 6, which works for sandwiching third material 3 between first material 1 and second material 2, enabling third material 3 to be compressive-secured.

This setting of the size of second gap 5 to be in the range of from 4% to 38%, inclusive, of the plate thickness of first material 1, which is on the side to which laser 7 is emitted, is derived from experimental data. An example of the experimental data is shown in FIG. 3.

Figure 3:
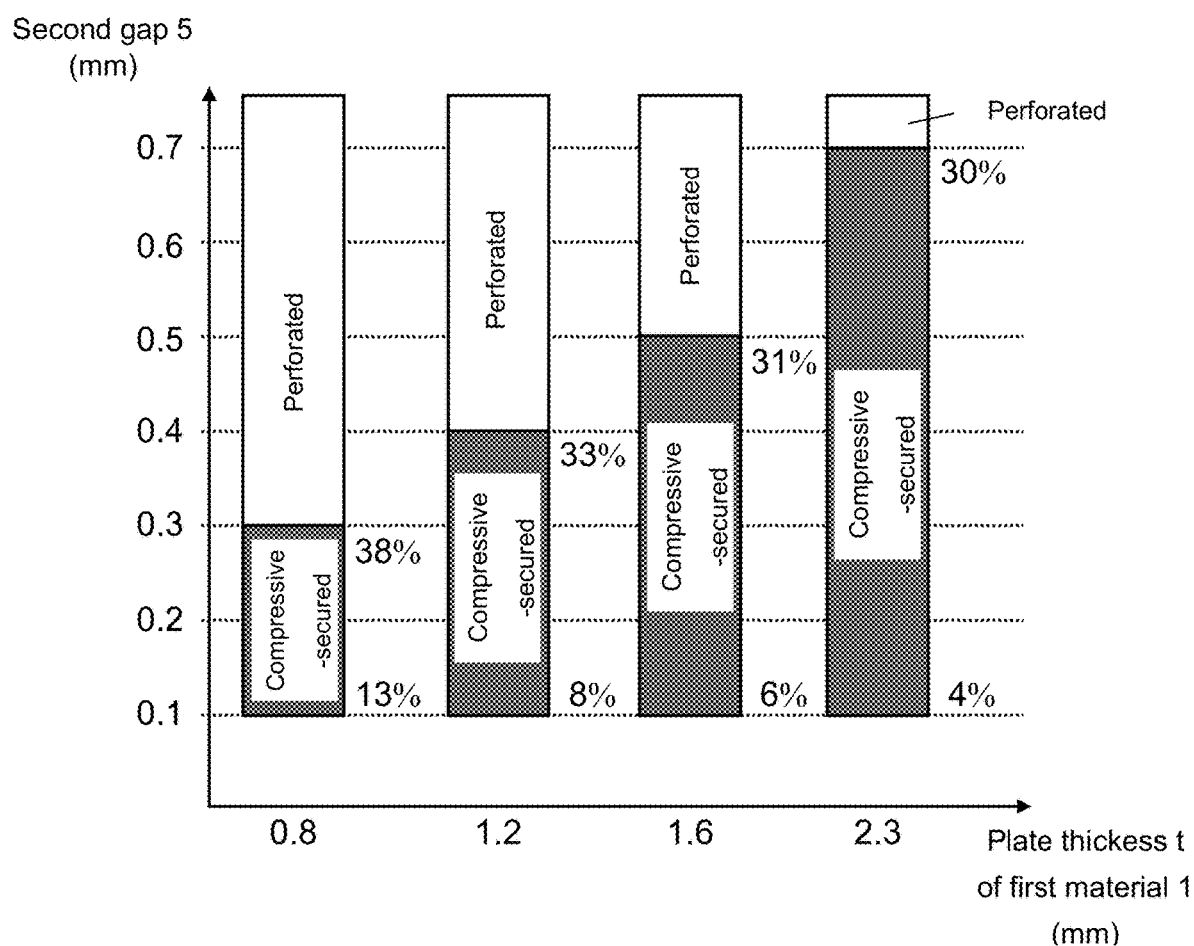
FIG. 3 is a graph showing the results of measurement illustrating the relationship between a plate thickness of a first material and a second gap, which is the gap between protrusions along a plate thickness direction, according to the first exemplary embodiment of the present disclosure.

FIG. 3 is a graph showing the results of measurement illustrating the relationship between plate thickness t of first material 1 and second gap 5, which is the gap along the plate thickness direction corresponding to protrusions 14, according to the first exemplary embodiment of the present disclosure.

In this experiment, both first material 1 and second material 2 are made of a mild steel material, which is a similar metal material, while third material 3 is made of a PET material, which is a resin material as a dissimilar material. With this combination, under a condition in which first material 1 is disposed above second material 2 and third material 3 is sandwiched by first material 1 and second material 2, laser 7 was emitted in a circular shape in a plate thickness direction within protrusion inner edge 10 of first material 1 to effect welding. Note that in this experiment, the output power of laser 7 was set to 3 kW.

The diameter of protrusion inner edge 10 of each of first material 1 and second material 2 was set to 10 mm, and the diameter of through hole 12 of third material 3 was set to 12 mm. The incident region for laser 7 that is emitted in the plate thickness direction to protrusion 14 should be set to be smaller than the diameter of protrusion inner edge 10 by a predetermined distance. In other words, when viewed from the direction in which laser 7 is emitted, the incident region of the protrusion 14 on which laser 7 is incident is smaller than the region defined by protrusion inner edge 10 of protrusion 14. In this experiment, welding was carried out in a circular shape with a diameter of 8 mm, which is close to the diameter of protrusion inner edge 10 and smaller than the diameter of protrusion inner edge 10. It should be noted that the above-mentioned numerical values are merely exemplary, and are not to be construed as limiting the invention.

Next, the results of the experiment shown in FIG. 3 will be described. In the graph shown in FIG. 3, the horizontal axis represents plate thickness t of first material 1, and the vertical axis represents the size of second gap 5. For example, when plate thickness t is 0.8 mm, setting second gap 5 to a size of from 0.1 mm to 0.3 mm enables third material 3 to be compressive-secured due to the solidification shrinkage effect of the fused metal in weld portion 8. If the size of second gap 5 is greater than 0.3 mm, part of the weld line will be perforated, causing a weld defect. Thus, when plate thickness t is 0.8 mm, the effective range of compressive-securing is in the range in which the size of second gap 5 is from 13% to 38%, inclusive, of plate thickness t of first material 1.

Also, when plate thickness t is 2.3 mm, second gap 5 having a size of from 0.1 mm to 0.7 mm enables third material 3 to be compressive-secured by the solidification shrinkage effect of the fused metal in weld portion 8. If the size of second gap 5 exceeds 0.7 mm, part of the weld line will be perforated, causing a weld defect. Thus, when plate thickness t of first material 1 is 2.3 mm, the effective range of compressive-securing is in the range in which the size of second gap 5 is from 4% to 30%, inclusive, of plate thickness t of first material 1. Accordingly, welding becomes possible when, in the region defined by protrusion inner edge 10 or through hole 12 along the plate thickness direction, which is the region corresponding to protrusion 14, the size of second gap 5 depending on plate thickness t of first material 1 disposed on the side from which laser 7 is emitted, is within a predetermined range. Specifically, when the size of second gap 5 is in the range of from 4% to 38%, inclusive, of plate thickness t of first material 1, welding is possible. In addition, when the size of second gap 5 is within the predetermined range, third material 3 can be compressive-secured by first material 1 and second material 2.

This indicates that, when plate thickness t of first material 1 and the size of second gap 5 satisfy the above-described relationship, fused metal corresponding to at most 30% to 38%, inclusive, of plate thickness t of first material 1 falls into second gap 5, enabling second material 2 to be compressive-secured and joined without causing perforation. If the size of second gap 5 exceeds at most 30% to 38% of plate thickness t of first material 1, the amount of fused metal necessary to fill second gap 5 is insufficient, causing the weld line to be partially perforated.

On the other hand, if second gap 5 is less than 0.1 mm, the gap between protrusions 14 is too small, so first material 1 and second material 2 are fuse bonded to each other, resulting in an insufficient compressive force 6 to compressive-secure third material 3.

Thus, when the size of second gap 5 is greater to the extent the amount of fused metal is sufficient during welding, in other words, to the extent that the perforation does not form, the solidification shrinkage between protrusions 14 of weld portion 8 is accordingly greater. This increases compressive force 6, which serves as a securing force for clamping third material 3 by first material 1 and second material 2.

The foregoing has described cases where laser 7 is emitted from the side on which first material 1 is disposed, but the same advantageous effects may also be obtained when laser 7 is emitted from the side on which second material 2 is disposed. When laser 7 is emitted from second material 2, the size of second gap 5 should be from about 4% to about 40% of the plate thickness of second material 2 so that first material 1 and second material 2 can be welded together. Moreover, third material 3 can be compressive-secured by first material 1 and second material 2.

Although the present exemplary embodiment describes that protrusion 14 of first material 1 and protrusion 14 of second material 2 have the same shape, protrusions 14 may not necessarily have the same shape. In addition, the laser application direction is configured so that laser 7 is emitted from the side where first material 1 exists, but this is merely an example. When second gap 5 is set according to the plate thickness of the similar metal material disposed on the side from which laser 7 is emitted in the plate thickness direction so that second gap 5 between protrusions 14 will be from 4% to 38%, inclusive, of the plate thickness of the material that is disposed on the side from which laser 7 is emitted, it is possible to ensure that the amount of fused metal that is necessary to fill second gap 5 is sufficient in welding. With this configuration, third material 3 can be clamped and compressive-secured by first material 1 and second material 2 because of the solidification shrinkage of weld portion 8 during welding.

For this reason, it is also possible to obtain the same effect when the laser application is conducted from below, not from above, so that laser 7 is emitted from a side where second material 2 exists. In addition, although the present exemplary embodiment describes that first material 1 and second material 2 are made of similar metal materials and each of which is a mild steel material, it is also possible that first material 1 and second material 2 may be made of different materials as long as they are weldable to each other and made of similar metal materials that can obtain a sufficient joining strength. Examples of possible combinations of first material 1 and second material 2 as similar metal materials include the following. Examples of possible combinations of ferrous metal materials include mild steel to mild steel, stainless steel to stainless steel, and high tensile steel to stainless steel, as well as mild steel to high tensile steel, and high tensile steel to stainless steel. Examples of possible combinations of nonferrous metal materials include aluminum to aluminum, aluminum alloy to aluminum alloy, and aluminum to aluminum alloy. The ferrous metal materials and nonferrous metal materials mentioned above are materials that can be joined by laser welding. Third material 3 as a dissimilar material may be copper, which shows a low absorption rate for a laser beam and is difficult to be joined by laser welding, various types of resin materials, and materials that are incompatible in terms of weldability with both first material 1 and second material 2. An example of combination of materials that are incompatible in terms of weldability is a combination in which aluminum material is employed as third material 3 that is to be welded to first material 1 and second material 2, when first material 1 and second material 2 are made of a mild steel material. Alternatively, the opposite combination is also possible.

The foregoing has described cases in which the dissimilar material, third material 3, comprises only one type of material. The following description explains cases in which two different types of dissimilar materials are employed.

Figure 1B:
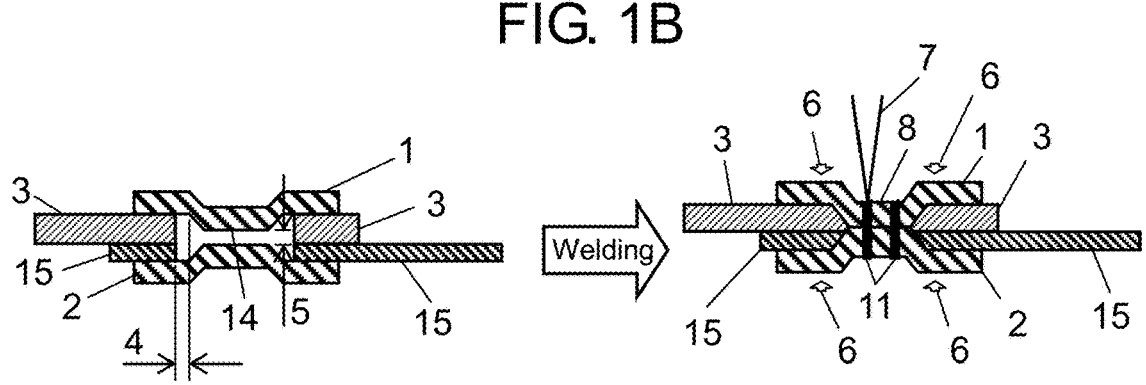
FIG. 1B is a cross-sectional view for illustrating another joint structure before and after welding according to the first exemplary embodiment of the present disclosure.

FIG. 1B is a view for illustrating a joint structure in a case in which two different types of dissimilar materials are employed. As illustrated in FIG. 1B, when two different types of dissimilar materials, third material 3 and fourth material 15, need to be joined, third material 3 and fourth material 15 are sandwiched between first material 1 and second material 2, which are similar metal materials. Then, laser welding is carried out while the size of second gap 5 is set to an appropriate size. In this case as well, it is possible to compressive-secure third material 3 and fourth material 15 to each other by compressive force 6 caused by the solidification shrinkage of fused metal of first material 1 and second material 2. In particular, when third material 3 and fourth material 15, which are two different types of dissimilar materials, are made of resin materials such as PET materials and non-metallic materials such as CFRP, laser 7 is highly transmissive. In other words, they often have a low absorption rate for laser 7. For this reason, as in the case of employing only one type of dissimilar material, the method of compressive-securing third material 3 and fourth material 15 by using first material 1 and second material 2 is effective. Specifically, second gap 5 for spacing protrusions 14 apart should be provided along the plate thickness direction, and a sufficient amount of fused metal necessary to fill second gap 5 should be supplied. Then, protrusions 14 should be fuse-bonded to each other, and third material 3 and fourth material 15 should be compressive-secured to each other with first material 1 and second material 2 by using compressive force 6 resulting from the solidification shrinkage of weld portion 8 between protrusions 14 during welding.

Figure 2B:
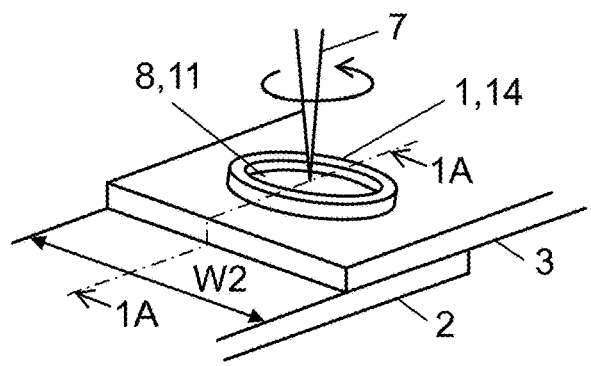
FIG. 2B is a perspective view for illustrating a state of joining in laser welding according to the first exemplary embodiment of the present disclosure.
Figure 2C:
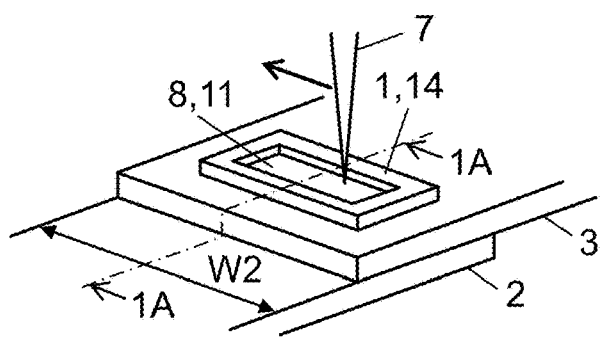
FIG. 2C is a perspective view for illustrating a state of joining in laser welding according to the first exemplary embodiment of the present disclosure.

Examples other than circular welding shown in FIG. 2A are shown in FIGS. 2B and 2C. FIGS. 2B and 2C are perspective views for illustrating a state of joining in laser welding according to the first exemplary embodiment of the present disclosure. FIG. 2B illustrates a joining condition in the case where the locus of scanning of laser 7 is in an elliptic shape. FIG. 2C illustrates a joining condition in the case where the locus of scanning of laser 7 is in a linear shape. As illustrated in FIGS. 2B and 2C, the shape of first material 1 is in accordance with the locus of scanning of laser 7. Specifically, FIG. 2A shows first material 1 in a circular shape, whereas FIG. 2B shows first material 1 in an elliptical shape and FIG. 2C shows first material 1 in a rectangular shape. In addition, as illustrated in FIG. 2B, width W2 of second material 2 and third material 3 is wider than width W1 of second material 2 and third material 3 that are shown in FIG. 2A. That is, weld portion 8 shown in FIG. 2B requires higher bonding strength along the direction of width W2 of third material 3 and second material 2 to be joined to each other, than weld portion 8 shown in FIG. 2A. Thus, when required bonding strength distribution shows directionality or when high bonding strength is required in a specific direction, first material 1 to be joined over second material 2 and third material 3 needs to be disposed so as to oppose the bonding strength distribution. For example, as illustrated in FIGS. 2B and 2C, the longer axis of the elliptical shape of first material 1 or the longer sides of the rectangular shape of first material 1 should be arranged along width W2 of second material 2 and third material 3. In other words, the longer axis of the elliptical shape of first material 1 or the longer sides of the rectangular shape of first material 1 should be arranged along the direction in which high bonding strength between the similar metal materials and the dissimilar material is required (for example, in the direction in which tensile resistance or torsional resistance is required). In contrast to the case where the shape of protrusion 14 is in a large circular shape, the area of the scanning locus of laser 7 can be reduced when the weld shape is configured to be an elliptical shape. Also, when the weld shape is configured to be a linear shape as shown in FIG. 2C, the area of the scanning locus of laser 7 can be reduced because protrusion 14 of first material 1 is formed in a rectangular shape rather than a large circular shape. When the locus of scanning of laser 7 is configured to be one or more straight lines, the locus of scanning of laser 7 is made simpler and the welding can be made in a shorter time than, for example, when forming a circular welding shape or an elliptical welding shape at a plurality of locations in a direction in which high bonding strength is required.

Next, another example for further increasing strength and another example for facilitating positioning will be described with reference to FIGS. 4A and 4B.

Figure 4A:
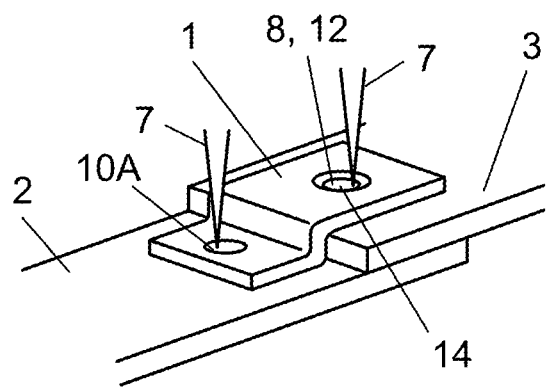
FIG. 4A is a view illustrating an example of use of the first exemplary embodiment of the present disclosure.
Figure 4B:
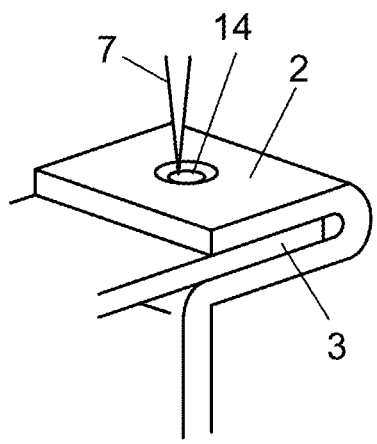
FIG. 4B is a view illustrating another example of use of the first exemplary embodiment of the present disclosure.

FIGS. 4A and 4B are views illustrating examples of use of the first exemplary embodiment of the present disclosure. In FIG. 4A, first material 1 has the function of positioning third material 3 and second material 2 in joining and the function of enhancing tensile strength. As illustrated in FIG. 4A, third material 3 is sandwiched between second material 2 and first material 1 bent in a step-like shape, which are similar metal materials, in such a manner that predetermined second gap 5 is provided along the plate thickness direction of through hole 12 of third material 3.

Further, as illustrated in FIG. 4A, first material 1 is joined to second material 2 at the following two locations. As the first location, a location of first material 1 provided with protrusion 14 is joined to second material 2 via third material 3. As the second location, another location 10A of first material 1, which is a different location from the first location, is directly joined to second material 2. Thereby, weld portion 8 of first material 1 and second material 2 that is joined via third material 3 can be prevented from being stressed intensely when second material 2 is pulled or twisted relative to third material 3. As a result, it is possible to increase the strength of joining of similar metal materials with a dissimilar material as a whole.

As illustrated in FIG. 4B, second material 2 may include protrusion 14 of first material 1, and by folding second material 2 over itself, it is possible to join third material 3 to second material 2 without using first material 1. This structure can be embodied by allowing the function of protrusion 14 of first material 1 to be included in at least one of the upper plate or the lower plate of second material 2 that sandwiches third material 3. This eliminates the need of a jig for holding third material 3. Moreover, third material 3 can be provisionally fixed by inserting third material 3 into second material 2, so positioning of third material 3 can be made easier.

Here, the upper plate portion formed by folding second material 2 over itself, as shown in FIG. 4B, corresponds to first material 1 in the present exemplary embodiment. In other words, in the present exemplary embodiment, first material 1 and second material 2 may be integrated with each other prior to welding.

Thus, the joint structure through welding with the use of laser 7 according to the present exemplary embodiment is a joint structure as follows. The joint structure includes first material 1, second material 2 being made of a similar metal material and weldable to the first material, and third material 3, at least a portion of which being sandwiched between first material 1 and second material 2, having a through opening portion at the sandwiched portion, and being made of a material that is difficult to be welded to both first material 1 and second material 2, the first material and the second material welded via the through opening portion. At least one of first material 1 and second material 2 is provided with protrusion 14 inserted in a through opening portion. In addition, first gap 4 is provided between the inner peripheral surface of the through opening portion and protrusion 14. In addition, in a region corresponding to protrusion 14 along a plate thickness direction, second gap 5 having a size depending on the plate thickness of first material 1 in that region is provided between first material 1 and second material 2. First material 1 and second material 2 are welded by applying a laser beam from a side on which first material 1 is disposed, under a condition in which the size of second gap 5 is greater than or equal to 0.1 mm and less than or equal to 38% of the plate thickness of first material 1 in the region.

With this joint structure, third material 3 can be compressive-secured by compressive force 6 in the plate thickness direction by fuse-bonding first material 1 and second material 2 to each other.

Figure 1C:
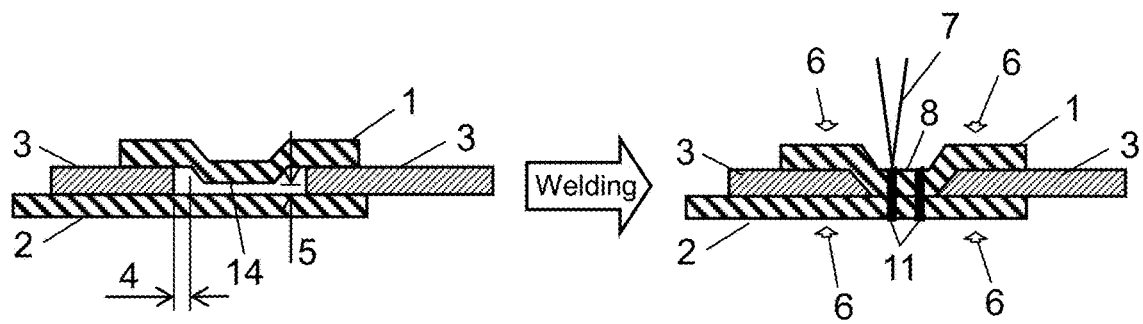
FIG. 1C is a cross-sectional view for illustrating a joint structure before and after welding according to a second exemplary embodiment of the present disclosure.

Thereby, the joint structure according to the present exemplary embodiment enables highly reliable joining between a similar metal material and a dissimilar material that is difficult to be welded to the similar metal material, and also reduces the production takt time significantly. Furthermore, the joint structure according to the present exemplary embodiment makes it possible to increase rigidity at necessary locations and enhance design flexibility Second Exemplary Embodiment Next, a second exemplary embodiment will be described with reference to FIG. 1C. FIG. 1C is a cross-sectional view for illustrating a joint structure before and after welding according to the second exemplary embodiment of the present disclosure. The description of the same parts as those described in the first exemplary embodiment will be omitted. A difference in the present exemplary embodiment from the first exemplary embodiment is that first material 1 has protrusion 14 but second material 2 does not have protrusion 14. Eliminating protrusion 14 from second material 2 makes it possible to reduce the cost of processing the material. An additional advantage is that the positions of first material 1 and third material 3 are not affected by misalignment of second material 2. In the present exemplary embodiment, second gap 5 is provided when carrying out laser welding as in the first exemplary embodiment, whereby the solidification shrinkage of weld portion 8 causes compressive force 6 so that third material 3 sandwiched between first material 1 and second material 2 can be compressive-secured.

Although protrusion 14 is provided for first material 1 in the present exemplary embodiment, it is also possible that third material 3 may be provided with protrusion 14 but first material 1 may not be provided with protrusion 14. As long as the size of second gap 5 is set within the effective range of compressive-securing with respect to the plate thickness of first material 1 or second material 2, onto which laser 7 is emitted, part of the weld line is not perforated, so no weld defect is caused. Accordingly, as long as the size of second gap 5 is set appropriately, the laser beam may be emitted either from the side on which first material 1 is disposed or from the side on which second material 2 is disposed.

As described above, the joint structure formed by applying laser 7 in a plate thickness direction according to the present exemplary embodiment is such that a protrusion is formed on at least one of opposing surfaces of the first material and the second material in the through opening portion.

This makes it possible to join third material 3, which is a material that has low weldability and is difficult to weld, with a highly reliable method. In the present exemplary embodiment, protrusion 14 is formed on at least one of the opposing surfaces of first material 1 and second material 2, which are similar metal materials. Therefore, third material 3 and one of first material 1 or second material 2 that is provided with protrusion 14 are not affected by misalignment of the other one of the materials that is not provided with protrusion 14.

Third Exemplary Embodiment

Next, a third exemplary embodiment will be described with reference to FIG. 1A. The incident region in which laser 7 is emitted to protrusion 14 in a plate thickness direction is smaller than the diameter or the width of protrusion 14 in an embossed shape. That is, when viewed from the direction in which laser 7 is emitted, the incident region of protrusion 14 on which laser 7 is incident is smaller than the region defined by protrusion inner edge 10 provided with protrusion 14. In other words, the incident region is smaller than the region defined by protrusion inner edge 10 corresponding to protrusion 14. In the present exemplary embodiment, the incident region is smaller by about 2 mm in diameter or width than protrusion inner edge 10 of protrusion 14.

Here, in order to cause third material 3 as a dissimilar material to be fused by the welding heat input transmitted from weld portion 8 irradiated with laser 7 and fused thereby, it is important that protrusion inner edge 10 and protrusion outer edge 9 of each protrusion 14 of first material 1 and second material 2, which has an embossed shape extruded in a tapered shape, have an appropriate positional relationship with through hole 12 of third material 3.

Note that in the present disclosure, protrusion outer edge 9, which is the outermost contour of protrusion 14 of first material 1 and/or second material 2, which are similar metal materials, is simply called the diameter or width of protrusion 14.

When protrusion outer edge 9, which is the diameter or width of protrusion 14 to be inserted is within an appropriate range with respect to the diameter of through hole 12 of third material 3, the end portion (inner peripheral surface) of through hole 12 is indirectly affected by the welding heat input to weld portion 8 due to the application of laser 7, so that it is softened and fused. This softened and fused third material 3 flows into first gap 4. This enables third material 3 to be compressive-secured due to the solidification shrinkage of weld portion 8 and additionally intimately fixed to first material 1 and/or second material 2 in a direction intersecting the plate thickness direction of third material 3.

If the distance from protrusion outer edge 9 to the end portion (inner peripheral surface) of through hole 12 is too short in protrusion 14 to which laser 7 is emitted, the end portion is directly or indirectly affected by the welding heat input transmitted from weld portion 8 due to the application of laser 7.

This causes fused third material 3 at the end portion of through hole 12 to pass through first gap 4 and flow into second gap 5. As described previously, the fused metal irradiated with laser 7 falls into second gap 5. Therefore, when third material 3 is made of a material having a low boiling point, such as a resin, it may be evaporated and blown out, causing a weld defect in weld portion 8.

In addition, if first gap 4 is spaced by 2 mm or greater in the case where third material 3 is a resin material, or 1.5 mm or greater in the case where third material 3 is CFRP, the end portion of through hole 12 of third material 3 is not fused because it is difficult to be affected by the welding heat input of weld portion 8. Accordingly, third material 3 does not flow into first gap 4, and second material 2 flows toward the outer peripheral portion of protrusion 14 of first material 1, so it becomes difficult to intimately fix third material 3. Consequently, compressive-securing of third material 3 is effected only by the solidification shrinkage effect of first material 1 and second material 2.

Thus, the heat transfer condition from protrusion outer edge 9 to the end portion of through hole 12 and the fusing condition of third material 3 cause by the heat effect during welding vary depending on the size of first gap 4 and the material of third material 3.

It is also possible to carry out the positioning of protrusion 14 of a similar metal material to be inserted relative to the diameter of through hole 12 of a dissimilar material by using, for example, a support positioning method using a clamp securing jig, a positioning pin, and a robot arm, which are not shown.

The size of protrusion outer edge 9 formed by embossing protrusion 14 results in a size that is offset relative to protrusion inner edge 10 by about 1 mm to a size equivalent to the plate thickness in the outer circumferential direction in an embossed shape due to the pressing process for protrusion 14. However, for purposes of simplification, the present description defines it as 1 mm. Although it is preferable that the offset amount be equivalent to the plate thickness, it may be about 0.6 times to about 1.4 times of the plate thickness, as long as it does not cause an adverse effect on the strength in welding.

Figure 5:
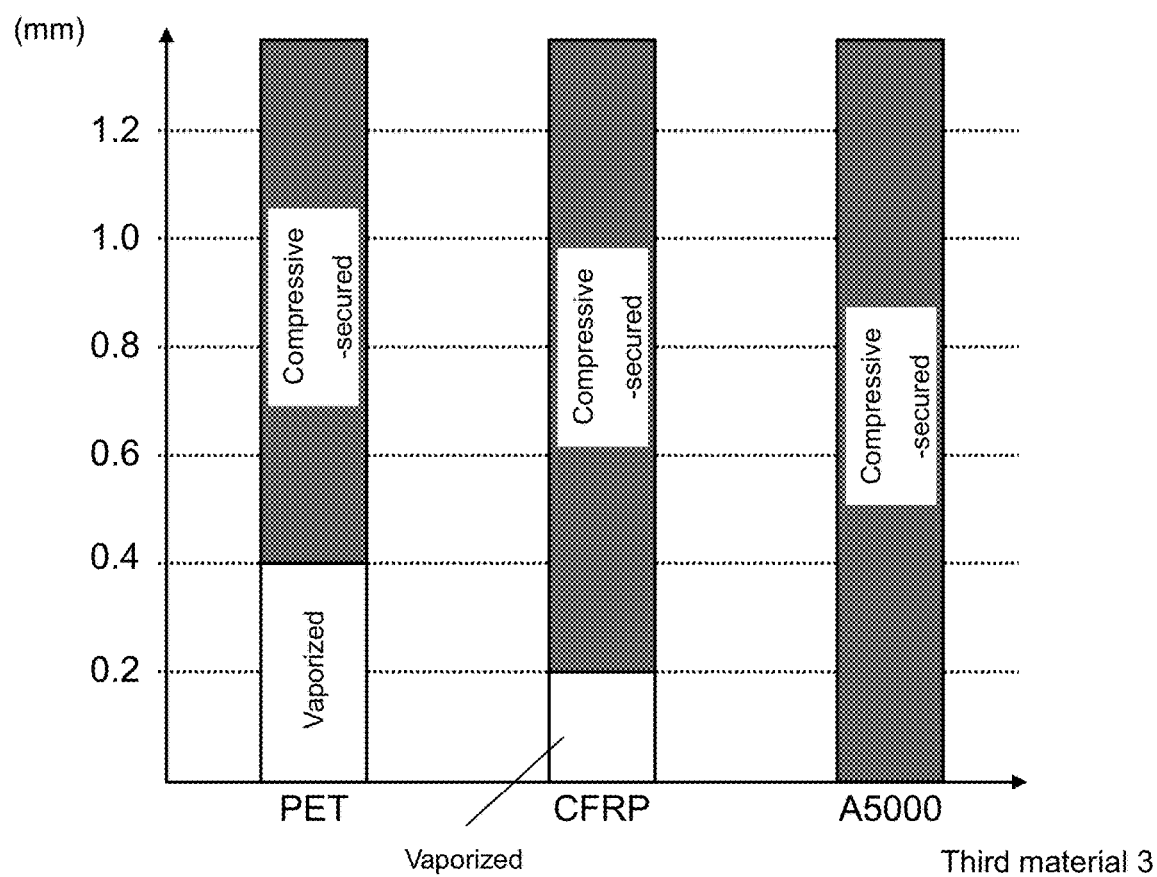
FIG. 5 is a graph showing the results of measurement illustrating the relationship between the first gap and the type of a third material, which is a dissimilar material, according to a third exemplary embodiment of the present disclosure.
Figure 6:
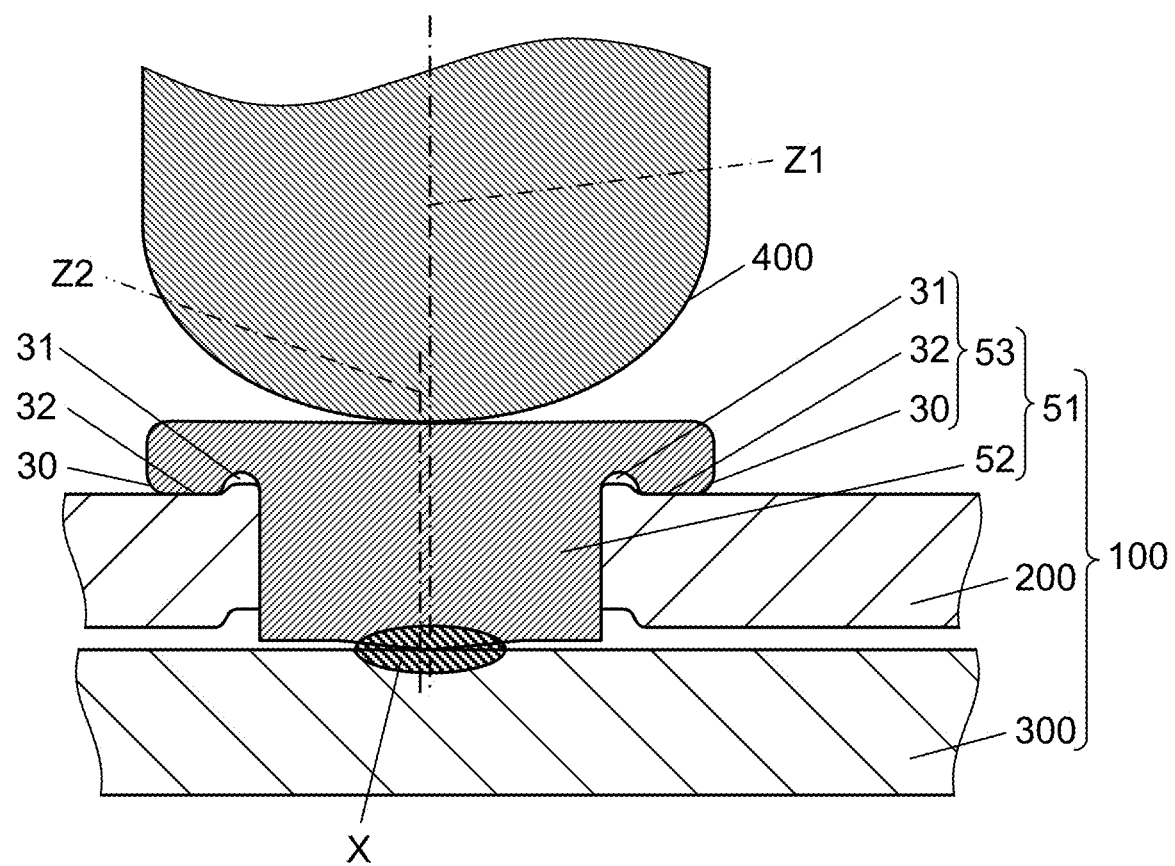
FIG. 6 is a view illustrating an embodiment of conventional dissimilar material joining.

The foregoing has been derived from experimental data, and an example of the experimental data is shown in FIG. 5.

FIG. 5 is a graph showing the results of measurement illustrating the relationship between first gap 4 and the type of third material 3, which is a dissimilar material, according to the third exemplary embodiment of the present disclosure.

In the graph shown in FIG. 5, the horizontal axis represents material for third material 3, and the vertical axis represents the size of first gap 4. Specifically, the materials used for third material 3 were a PET material, a CFRP material, and an A5000 material. Here, the A5000 material refers to an aluminum alloy, which is a nonferrous metal material.

In this experiment, first material 1 and second material 2 were made of a mild steel material, and plate thickness t was set to 1.6 mm. One of the above-described materials was used as third material 3, and the plate thickness thereof was set to 2.0 mm. With the above-described combination, under a condition in which first material 1 is disposed above second material 2 and third material 3 is sandwiched between first material 1 and second material 2, laser 7 was emitted in a circular shape within protrusion inner edge 10 of first material 1 to effect welding. In this experiment, the output power of laser 7 was set to 3 kW. For example, the diameter of protrusion inner edge 10 of each of first material 1 and second material 2 was set to 10 mm, and the diameter of through hole 12 of third material 3 was set to 12 mm. Welding was carried out by applying laser 7 to protrusion 14 in a circular locus with a diameter of 8 mm, which is smaller than the diameter of protrusion inner edge 10, in a plate thickness direction.

Next, the measurement results shown in FIG. 5 will be explained. As shown in FIG. 5, when third material 3 is the PET material, which is a resin material, first gap 4 having a size of greater than or equal to 0.4 mm enables third material 3 to be compressive-secured. This is because fused third material 3 does not flow into second gap 5 such as to cause a welding defect even when third material 3 is affected by the thermal effect of welding caused by laser 7 that is emitted to protrusion inner edge 10.

However, if the size of first gap 4 is less than 0.4 mm, i.e., if protrusion outer edge 9 and the end portion of through hole 12 are too close to each other, third material 3 fused by the thermal effect of laser 7 flows into second gap 5. This may cause third material 3, the PET material, to be evaporated and blown out, resulting in a weld defect in weld portion 8.

When third material 3 is the CFRP material, which is a resin material, setting first gap 4 to 0.2 mm or greater enables third material 3 to be compressive-secured. This is because fused third material 3 does not flow into second gap 5 such as to cause a welding defect even when third material 3 is affected by the thermal effect of welding caused by laser 7.

However, if first gap 4 is less than 0.2 mm, i.e., if protrusion outer edge 9 and the end portion of through hole 12 are too close to each other, third material 3 fused by the thermal effect of laser 7 emitted to protrusion inner edge 10 flows into second gap 5. This may cause third material 3, the CFRP material, to be evaporated and blown out, resulting in a weld defect in weld portion 8. As explained above, depending on the properties of the resin material, which is third material 3, such as the melting point and the boiling point, there are some variations in the permissible range of the size of first gap 4.

It should be noted that when third material 3 is the A5000 material, which is a nonferrous metal material, fused third material 3 does not flow into second gap 5 such as to cause a weld defect irrespective of the size of first gap 4 even when third material 3 is affected by the thermal effect of welding caused by laser 7 that is emitted to protrusion inner edge 10. Therefore, it is possible to achieve stable compressive-securing.

In order to insert protrusion outer edge 9 of protrusion 14 into through hole 12, it is preferable that first gap 4 should be, for example, greater than 0 mm, and should be greater than or equal to a size necessary to insert protrusion outer edge 9 into through hole 12.

The foregoing shows experimental data indicating an example of differences originating from the types of materials for third material 3, but almost the same tendency as in the case of using the PET material shown in FIG. 5 is observed as long as third material 3 is a resin material. When third material 3 is a nonferrous metal material, almost the same tendency as in the case of using the A5000 material, an aluminum alloy material, shown in FIG. 5 is observed. This is because, even when another nonferrous metal material is used as third material 3, it is not affected by the thermal effect such as to cause the inner peripheral surface of through hole 12 to be evaporated and blown out by the welding heat input during welding due to the application of laser 7 to protrusion 14 of first material 1, which causes a weld defect in weld portion 8. From the foregoing, it is believed that other nonferrous metal materials will show almost the same tendency.

Therefore, it is understood that, when third material 3 is a nonferrous metal material, it will not be affected by the thermal effect such as to fuse third material 3 and cause third material 3 to flow into second gap 5, which is the gap along the plate thickness direction between protrusions 14 of first material 1 and second material 2.

Fourth Exemplary Embodiment

Figure 1D:
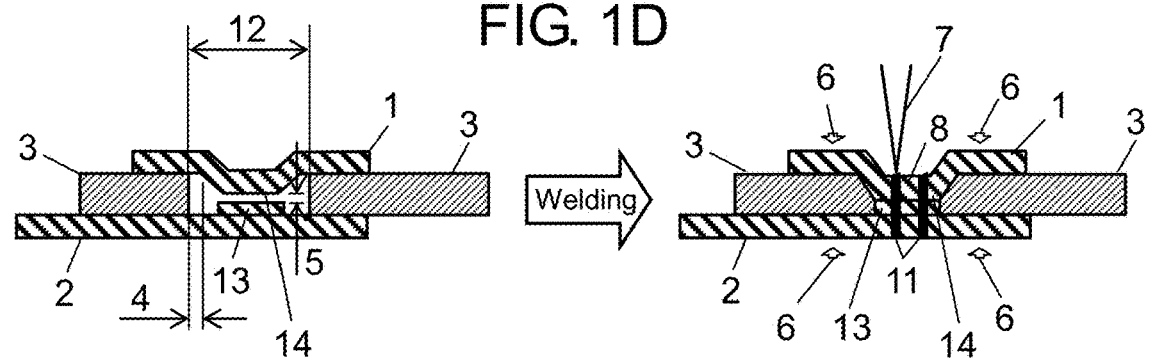
FIG. 1D is a cross-sectional view for illustrating a joint structure before and after welding according to a fourth exemplary embodiment of the present disclosure.

Next, a fourth exemplary embodiment will be described with reference to FIG. 1D. The description of the same parts as those described in the foregoing will be omitted. A difference from the first and second exemplary embodiments is that spacer 13 is used to reduce the size of second gap 5 when second gap 5, which is a gap along the plate thickness direction between protrusions 14 of first material 1 and second material 2, is excessively large. Spacer 13 should be made of a similar metal material to both first material 1 and second material 2 that is weldable thereto, and spacer 13 should be disposed inside through hole 12 of second material 2. This configuration makes it possible to reduce the size of second gap 5 in through hole 12 of third material 3 when applying laser 7 to perform welding. The plate thickness of spacer 13 should be set so that the size of second gap 5 with spacer 13 disposed becomes at most 30% to 38% of plate thickness t of first material 1, which is the upper plate irradiated with laser 7. Note that the size of second gap 5 with spacer 13 disposed means the gap along the plate thickness direction between spacer 13 and first material 1 with spacer 13 disposed between first material 1 and second material 2.

Spacer 13 disposed between first material 1 and second material 2 is not limited to one disposed as a separate part, but may be directly formed between first material 1 and second material 2 using a weld material, such as a consumable electrode and a filler.

In this case as well, a keyhole-type laser welding such as to pierce to second material 2, which is the lower plate, is performed as in the first and second exemplary embodiments, as long as second gap 5 is within a predetermined range depending on the plate thickness of the material on the size irradiated with laser 7, as shown in FIG. 3. As a result, solidification shrinkage occurs in weld portion 8, and the solidification shrinkage causes compressive force 6 to enable third material 3 to be compressive-secured.

Note that if the size of second gap 5 exceeds at most 30% to 38% of the plate thickness of first material 1, which is the upper plate irradiated with laser 7 in a plate thickness direction, the amount of fused metal necessary for second gap 5 is insufficient, causing the weld line to be partially perforated.

On the other hand, if the size of second gap 5 is less than 0.1 mm, the gap between protrusions 14 is too small, first material 1 and second material 2 as similar metal materials are fuse bonded to each other, resulting in an insufficient compressive force to compressive-secure third material 3, which is a dissimilar material.

Thus, it is preferable that the plate thickness of spacer 13 along the plate thickness direction in through hole 12 of third material 3 as a dissimilar material should be smaller than plate thickness t of first material 1, which is a similar metal material in the incident region on the side to which laser 7 is emitted in a plate thickness direction. In addition, when spacer 13 is disposed in through hole 12 of third material 3, which is a dissimilar material, it is preferable to set second gap 5, which is the gap between spacer 13 and first material 1, the upper plate, to 30% to 38%, inclusive, of plate thickness t of first material 1.

In other words, the thickness of spacer 13 is a thickness less than plate thickness t of first material 1, the upper plate, and depending on the size of second gap 5. Thus, the size of second gap 5 that can fill the gap along the relative plate thickness direction between first material 1, the upper plate, and second material 2, the lower plate, which are made of similar metal materials, with third material 3, which is made of a dissimilar material, sandwiched therebetween, is greater than or equal to 0.1 mm but less than or equal to 38% of the plate thickness of the similar metal material to which laser 7 is emitted.

For example, an example of setting the thickness of spacer 13 will be specifically described below. Although not shown in the drawings, it is assumed that neither first material 1 nor second material 2 is provided with a protrusion, and laser 7 is emitted via through hole 12 in the plate thickness direction under the condition in which third material 3 having through hole 12 provided with spacer 13 therein is sandwiched between first material 1 and second material 2, to fuse-bond first material 1 and second material 2 to each other to compressive-secure third material 3. In this case, when plate thickness t of first material 1, the upper plate, is 1.6 mm and the plate thickness of third material 3 is 2.0 mm, the second gap is 0.1 mm to 0.5 mm with a plate thickness t of first material 1 being 1.6 mm, as illustrated in FIG. 3. Accordingly, it is preferable that the thickness of spacer 13 be from 1.5 mm to 1.9 mm, inclusive.

In the present exemplary embodiment, laser 7 is emitted from the side on which first material 1, the upper plate, is disposed, but it is also possible to apply laser 7 from the side on which third material 3, the lower plate, is disposed.

Conventional rivet 51 as a member for joining a dissimilar material needs to provide the space for allowing a portion of the dissimilar material to deform and move therein during swaging and during spot welding, and to prevent the dissimilar material from depression due to misalignment of electrodes during spot welding to inhibit the fastening force from deteriorating. For that reason, rivet 51 requires a complicated and highly precise shape, such as R (radius) shaped chamfer 30 and annular groove 31.

In this case, because high precision is required for the shape of rivet 51, which is complicated, precision machining or the like is necessary, which also increases the manufacturing cost. Moreover, because of spot welding, it requires it requires long time for compressing, electric current application, cooling, transferring, etc., resulting in low productivity. Furthermore, because the materials need to be clamped from both sides, design flexibility is restricted. In addition, if a rivet is arranged to be too close to an adjacent rivet, electric current for spot welding may branch into the adjacent rivet, resulting in insufficient formation of nugget, which is a weld-solidified portion that forms at the weld portion that is joined by resistance welding. For this reason, it is necessary to provide a joining pitch that is greater than or equal to the minimum pitch at which desired nugget formation is possible. Consequently, it is impossible to increase joining rigidity at necessary locations.

The present disclosure is able to solve the problems in the conventional technology. As shown in the joint structures of the exemplary embodiments hereinabove, the joint structure according to the present disclosure includes first material 1, second material 2 being made of a similar metal material and weldable to first material 1, and third material 3, at least a portion of which being sandwiched between first material 1 and second material 2, having a through opening portion at the sandwiched portion, and being made of a material that is difficult to be welded to both first material 1 and second material 2, first material 1 and second material 2 welded via the through opening portion. At least one of first material 1 and second material 2 is provided with protrusion 14 inserted in the through opening portion, first gap 4 is provided between protrusion 14 and the inner peripheral surface of the through opening portion, and second gap 5 is provided between first material 1 and second material 2 in a region corresponding to protrusion along a plate thickness direction, so as to have a size depending on the plate thickness of first material 1 in that region. First material 1 and second material 2 are welded by applying a laser beam from a side on which first material 1 is disposed, under a condition in which the size of second gap 5 is greater than or equal to 0.1 mm, and less than or equal to 38% of the plate thickness of first material 1 in the region.

This configuration enables similar metal materials to be fuse-bonded to compressive-secure a dissimilar material. Moreover, by using the joint structure of the present disclosure, in which a dissimilar material and similar metal materials are fixed, complicated and high-precision structural components are not needed to join the dissimilar material.

In addition, the laser welding method according to the present disclosure enables first material 1 and second material 2 to be fuse-bonded to each other so as to compressive-secure third material 3 with first material 1 and second material 2 using laser welding only, by setting the size of first gap 4 and the size of second gap 5 to be within predetermined ranges.

Furthermore, because laser welding is employed rather than spot welding, production time including welding is reduced to about 25% of the production time required for spot welding, so productivity is significantly improved. In addition, it is possible to increase rigidity at necessary locations and enhance flexibility of design.

INDUSTRIAL APPLICABILITY

The present disclosure is industrially useful for a joint structure for laser welding that, with a simple structure, significantly reduces production takt time, increases rigidity at necessary locations, and enhances flexibility of design, in joining dissimilar materials.

REFERENCE MARKS IN THE DRAWINGS 1 first material
2 second material
3 third material
4 first gap
5 second gap
6 compressive force
7 laser
8 weld portion
9 protrusion outer edge
10 protrusion inner edge
11 weld bead
12 through hole
13 spacer
14 protrusion
15 fourth material

The invention claimed is:

1. A joint structure comprising:
a first material;
a second material including a similar metal material to the first material, the second material being weldable to the first material; and
a third material, at least a portion of which being sandwiched between the first material and the second material, the third material including a through opening portion in the sandwiched portion and including a material that is difficult to be welded to both the first material and the second material, the third material being a resin material, the first material and the second material welded to each other via the through opening portion, wherein
the first material and the second material are welded by emitting a laser beam from a side on which the first material is disposed, under a condition in which: at least one of the first material and the second material is provided with a protrusion inserted in the through opening portion; a first gap is provided between the protrusion and an inner peripheral surface of the through opening portion; a second gap is provided between the first material and the second material, the second gap having a size depending on a plate thickness of the first material in a region corresponding to the protrusion along a plate thickness direction; and the size of the second gap is greater than or equal to 0.1 mm and less than or equal to 38% of the plate thickness of the first material in the region, and wherein
the inner peripheral surface is indirectly heated and fused by welding heat input to the protrusion by the laser beam and intimately fixed to an outer peripheral side of the protrusion.

2. The joint structure according to claim 1, wherein, when viewed from a direction in which the laser beam is emitted, an incident region of the protrusion on which the laser beam is incident is smaller than a region defined by a protrusion inner edge of the protrusion.

3. The joint structure according to claim 1, further comprising a spacer disposed between the first material and the second material in the through opening portion, the spacer including a material weldable to both the first material and the second material and having a thickness less than the plate thickness of the first material in the region and depending on the size of the second gap.

* * * * *